United States Patent
Pi et al.

(10) Patent No.: US 9,990,533 B2
(45) Date of Patent: Jun. 5, 2018

(54) SELF-CAPACITIVE FINGERPRINT SENSOR WITH ACTIVE AMPLIFIED PIXELS

(71) Applicant: Shenzhen Goodix Technology Co., Ltd., Shenzhen (CN)

(72) Inventors: Bo Pi, Carlsbad, CA (US); Mengta Yang, Taipei (TW); Yi He, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days. days.

(21) Appl. No.: 15/297,124

(22) Filed: Oct. 18, 2016

(65) Prior Publication Data
US 2017/0103246 A1   Apr. 13, 2017

Related U.S. Application Data

(63) Continuation of application No. PCT/CN2015/091490, filed on Oct. 8, 2015.
(Continued)

(51) Int. Cl.
*G06K 9/00* (2006.01)
*G06F 3/041* (2006.01)

(52) U.S. Cl.
CPC .......... *G06K 9/001* (2013.01); *G06F 3/0416* (2013.01); *G06K 9/0002* (2013.01)

(58) Field of Classification Search
CPC ..... G06K 9/001; G06K 9/0002; G06F 3/0416
See application file for complete search history.

(56) References Cited

U.S. PATENT DOCUMENTS 6,016,355 A *  1/2000  Dickinson ............. G01B 7/004
                                                324/678
6,518,560 B1 *  2/2003  Yeh ..................... G06K 9/0002
                                                250/214 AG
(Continued)

FOREIGN PATENT DOCUMENTS

CN   103902971 A   7/2014
CN   203858581 U   10/2014
(Continued)

OTHER PUBLICATIONS

International Search Report and Written Opinion for International Application No. PCT/CN2015/091490, Applicant: Shenzhen Huiding Technology Co., Ltd., Jan. 4, 2016, 10 pages.
(Continued)

*Primary Examiner* — David F Dunphy (57) ABSTRACT

In one aspect, a fingerprint sensor device includes a substrate and a sensor chip disposed over the substrate. The sensor chip includes an array of sensor pixels configured to generate fingerprint data by sensing ridges and valleys of a surface of a finger contacting the fingerprint sensor device. Each sensor pixel includes a single sensor electrode an amplifier having an inverting terminal electrically connected to the sensor electrode and a non-inverting terminal electrically connected to a drive signal. The drive signal generates electric fields between the sensor electrode and at least one of the ridges and valleys of the surface of the finger contacting the fingerprint sensor device to generate a variable capacitor having a variable capacitance based at least partly on a distance between the sensor electrode and the at least one of the ridges and valleys of the finger.

20 Claims, 9 Drawing Sheets

Related U.S. Application Data (60) Provisional application No. 62/060,526, filed on Oct. 6, 2014, provisional application No. 62/181,724, filed on Jun. 18, 2015.

(56) References Cited

U.S. PATENT DOCUMENTS

| | | | |
|---|---|---|---|
| 2003/0215976 A1 | 11/2003 | Chou et al. | |
| 2005/0213799 A1* | 9/2005 | Sawano | G06K 9/0002 382/124 |
| 2006/0093192 A1* | 5/2006 | Bechtel | G06K 9/00013 382/126 |
| 2010/0108408 A1* | 5/2010 | Colgate | G06F 3/016 178/18.03 |
| 2013/0083208 A1* | 4/2013 | Koh | H04N 5/232 348/207.2 |
| 2014/0125470 A1† | 5/2014 | Rosenberg | |
| 2014/0262848 A1* | 9/2014 | Fathollahi | A45C 11/00 206/37 |
| 2016/0078268 A1† | 3/2016 | Mankowski | |

FOREIGN PATENT DOCUMENTS

| | | |
|---|---|---|
| CN | 104392164 A | 3/2015 |
| CN | 104408358 A | 3/2015 |
| CN | 104866362 A | 8/2015 |

OTHER PUBLICATIONS

Kwang-Hyun Lee and Euisik Yoon, A 500dpi Capacitive-Type CMOS Fingerprint Sensor with Pixel-Level Adaptive Image Enhancement Scheme, Feb. 7, 2002, 2002 IEEE International Solid-State Circuits Conference, San Francisco CA.†

\* cited by examiner
† cited by third party

SELF-CAPACITIVE FINGERPRINT SENSOR WITH ACTIVE AMPLIFIED PIXELS

CROSS REFERENCE TO RELATED APPLICATIONS

This application is a continuation of International Patent Application No. PCT/CN2015/091490, with an international filing date of Oct. 8, 2015, which claims the priorities of U.S. Provisional Patent Application No. 62/060,526, filed on Oct. 6, 2014, and U.S. Provisional Patent Application No. 62/181,724, filed on Jun. 18, 2015, all of which are hereby incorporated by reference in their entireties.

TECHNICAL FIELD

This disclosure generally relates to fingerprint recognition for securely accessing an electronic device including mobile and wearable devices.

BACKGROUND

Electronic devices including portable or mobile computing devices, such as laptops, tablets, smartphones, and gaming systems can employ user authentication mechanisms to protect personal data and prevent unauthorized access. User authentication on an electronic device can be carried out through one or multiple forms of biometric identifiers, which can be used alone or in addition to conventional password authentication methods. A popular form of biometric identifiers is a person's fingerprint pattern. A fingerprint sensor can be built into the electronic device to read a user's fingerprint pattern so that the device can only be unlocked by an authorized user of the device through authentication of the authorized user's fingerprint pattern.

SUMMARY

This disclosure describes technology for providing devices, systems, and techniques that perform human fingerprint detection and authentication for authenticating an access attempt to a locked device including a mobile device equipped with a fingerprint detection device. The fingerprint detection device described in this disclosure incorporates self-capacitive sensing with active sensor pixels and amplification. The fingerprint sensor device incorporating self-capacitive sensing with active sensor pixels and amplification can potentially gain a number of valuable advantages. For example, because self-capacitive sensing with active sensor pixels and amplification eliminates the need for an excitation electrode external to the fingerprint sensor device, the entire fingerprint sensor device can be implemented to be disposed under a protective cover glass (e.g., sapphire). The under-the-glass implementation can protect the fingerprint sensor device from environmental hazards including the finger, moisture, dust, etc. Also, the self-capacitive sensing with active sensor pixels and amplification allows for selectively driving all sensor pixels in a scan row or column to increase the number of sensor pixels contributing to each read sensor signal. These and other potential advantages will be apparent from the following descriptions.

DETAILED DESCRIPTION

Electronic devices equipped with fingerprint authentication mechanisms may be hacked by malicious individuals who can obtain the authorized user's fingerprint, and copy the stolen fingerprint pattern on a carrier object that resembles a human finger, which can then be used to unlock the targeted device. Hence, the fingerprint pattern, although a unique biometric identifier, may not be by itself a completely reliable or secure identification. The techniques, devices and systems described in this document improve upon the fingerprint authentication technology used in existing electronic devices to potentially prevent a stolen fingerprint from being used to gain access to the targeted device.

Embodiments described in this document provide devices, systems, and techniques that implement various fingerprint detection modules for human fingerprint detection and authentication. Moreover, embodiments described in this document provide devices, systems, and techniques that implement various fingerprint detection modules to determine if a detected object is human. The technology disclosed in this document can be combined with an additional measurement obtained from a person to combine with the person's fingerprint pattern as a combined authentication method to identify whether the authorized person is accessing the device.

Figure 1A:
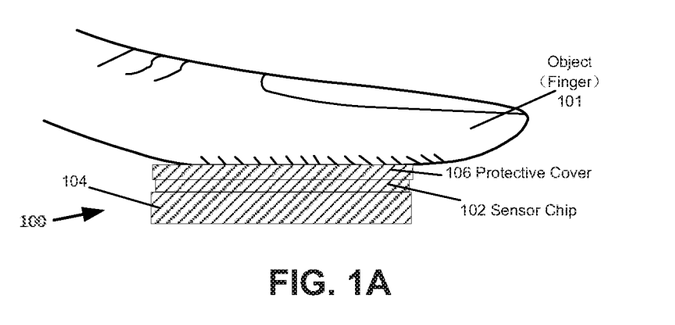
FIG. 1A is a block diagram showing an exemplary fingerprint sensor device implementing self-capacitive sensing with active sensor pixel and amplification.

FIG. 1A is a block diagram showing an exemplary fingerprint sensor device 100 implementing self-capacitive sensing with active sensor pixel and amplification. The self-capacitive fingerprint sensor device 100 includes a sensor chip 102 disposed over a substrate carrier 104 and a protective film or cover layer 106 disposed over the sensor chip 102. The protective film or cover layer 106 can include an insulator or dielectric material such as glass, silicon dioxide ($SiO_2$), sapphire, plastic, polymer, and other substantially similar materials. The protective film or cover layer 106 can be present to protect the sensor chip 102 and to function as a part of a dielectric layer between a surface of a finger 101 and conductive sensing electrodes of individual sensor pixels in the sensor chip 102. The protective film or cover layer 106 is an optional layer depending on the application of the fingerprint sensor device 100. As described with respect to FIGS. 3A and 3B, the fingerprint sensor device 100 can be disposed through an opening of a top cover glass of an electronic device such as a mobile phone or under a top cover glass of the electronic device. When used in the under-the-glass application, the protective film or cover 106 is not needed because the top cover glass of the electronic device will function to protect the sensor chip 102 and act as the dielectric layer. The sensor chip 102 includes an array of sensor pixels that in combination senses or captures fingerprint data from the finger 101 in contact with the protective film or cover layer 106. Each sensor pixel of the sensor chip 102 generates an output signal (e.g., a voltage) based on a capacitance of a capacitor associated with a ridge or valley of the finger 101. The output signals when combined represent a fingerprint image of the finger 101. Higher the number of pixel sensors, greater the resolution of the fingerprint image.

Figure 1B:
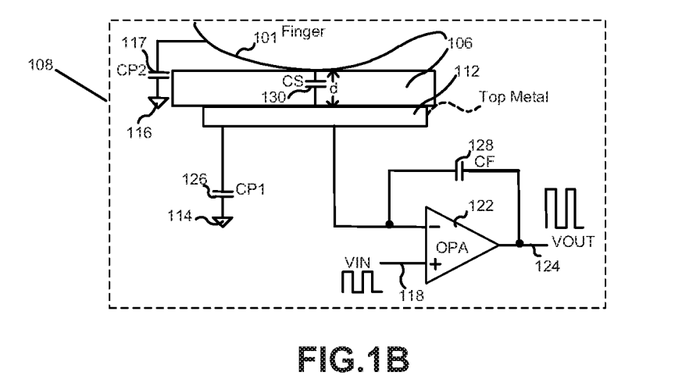
FIG. 1B shows an exemplary sensor pixel.

An exemplary sensor pixel 108 is shown in FIG. 1B. Each sensor pixel in the array of sensor pixels of the sensor chip 102 can be substantially similar to the exemplary sensor pixel 108. The exemplary sensor pixel 108 includes an operational amplifier 122 to amplify a capacitance related signal (e.g., voltage signal) detected by the exemplary sensor pixel 108. A sensor electrode 112 that includes a conductive material, such as one of a variety of metals is electrically connected to a negative or inverting terminal of the amplifier 122. The amplifier configuration shown and described with respect to FIG. 1B (and other figures of this disclosure) is just one example and other amplifier configurations are possible including a positive feedback configuration. The sensor electrode 112 and a local surface of the finger 101 function as opposing plates of a capacitor CS 130. The capacitance of the capacitor CS 130 varies based on a distance 'd' between the local surface of the finger 101 and the sensor electrode 112, the distance between the two plates of the capacitor CS 130. The capacitance is inversely proportional to the distance 'd' between the two plates of the capacitor CS 130. The capacitance is larger when the sensor electrode 112 is opposite a ridge of the finger 101 than when opposite a valley of the finger 101.

In addition, various parasitic capacitors can be formed between different conductive elements in the exemplary sensor pixel 108. For example, a parasitic capacitor CP1 126 can form between the sensor electrode 112 and a device ground terminal 114. Another parasitic capacitor CP2 117 can form between the local surface of the finger 101 and an earth ground 116. Device ground is coupled to earth ground closely. Yet another capacitor CF 128 can form between an output conductor of the amplifier 122 and the negative or inverting terminal of the amplifier 122 and functions as a feedback capacitor to the amplifier 122.

The positive terminal of the amplifier 122 is electrically connected to an excitation signal Vin 118. The excitation signal Vin 118 can be directly provided to the positive terminal of a dedicated amplifier in each sensor pixel. By providing the excitation signal Vin 118 directly to the positive terminal of the amplifier 122, the exemplary sensor pixel 108 becomes an active sensor pixel. In addition, providing the excitation signal Vin 118 directly to the positive terminal of the amplifier 122 eliminates the need to include an excitation electrode, common to all sensor pixels, which reduces a conductive (e.g., metal) layer from the semiconductor structure of the sensor chip 102. In addition, by providing the excitation signal Vin 118 directly to the amplifier 122, the excitation signal Vin 118 is not applied directly to the finger to avoid potentially irritating or injuring the finger 101. Moreover, because the excitation electrode for applying the excitation signal directly to the finger is not used, all components of the fingerprint sensor device 100 can be integrated into a single packaged device, and the entire fingerprint sensor device 100 can be disposed under the protective cover glass. With the entire fingerprint sensor device 100 disposed under the protective cover glass, the fingerprint sensor device 100 is protected from the finger and other external elements that can potentially damage the fingerprint sensor.

The amplifier 122 can generate an output signal based at least on the variable capacitance of the variable capacitor CS 130, and the output signal can contributes to the overall fingerprint data. The amplifier 122 can generate the output signal based at least on the variable capacitance and feedback capacitance of the feedback capacitor CF with no additional non-parasitic capacitances contributing to the output signal. This is partly because, as described above, an additional electrode such as an external drive electrode is not uses in the sensor pixel 108.

Figure 1C:
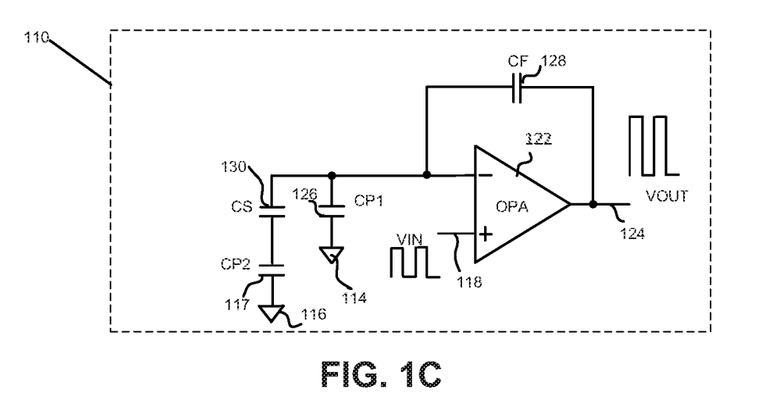
FIG. 1C is a circuit equivalent of the exemplary sensor pixel shown in FIG. 1B.

FIG. 1C is a circuit equivalent 110 of the exemplary sensor pixel 108 shown in FIG. 1B. The operational amplifier 122 has the negative or inverting terminal electrically connected to capacitor CS 130, which is in series with the parasitic capacitor CP2 117. The negative or inverting terminal of the amplifier 122 is also electrically connected to the parasitic capacitor CP1 126, which is in parallel with the series combination of capacitors CS 130 and CP2 117. The negative or inverting terminal of the amplifier 122 is also electrically connected to the feedback capacitor CF 128. The excitation signal Vin 118 is directly applied to the positive or non-inverting terminal of the amplifier 122.

The output signal 124 of the amplifier 122 is the amplified voltage of the signal detected by the exemplary pixel sensor 108. The following equation 1 shows the transfer function of the amplifier output 124 shown in FIG. 1C.

$$VOUT = VIN \cdot \left[1 + \frac{CP1}{CF} + \frac{CS \cdot CP2}{CF(CS + CP2)}\right] \quad \text{(Equation 1)}$$

Because normally, CP2>100×CS, equation 1 can be simplified as following equation 2:

$$VOUT = VIN \cdot \left[1 + \frac{CP1}{CF} + \frac{CS}{CF}\right] \quad \text{(Equation 2)}$$

Because the fingerprint data is reflected in changes to the capacitance of CS 130, the changes to the capacitance and the fingerprint data are likewise reflected in the output signal Vout 124.

Figure 2:
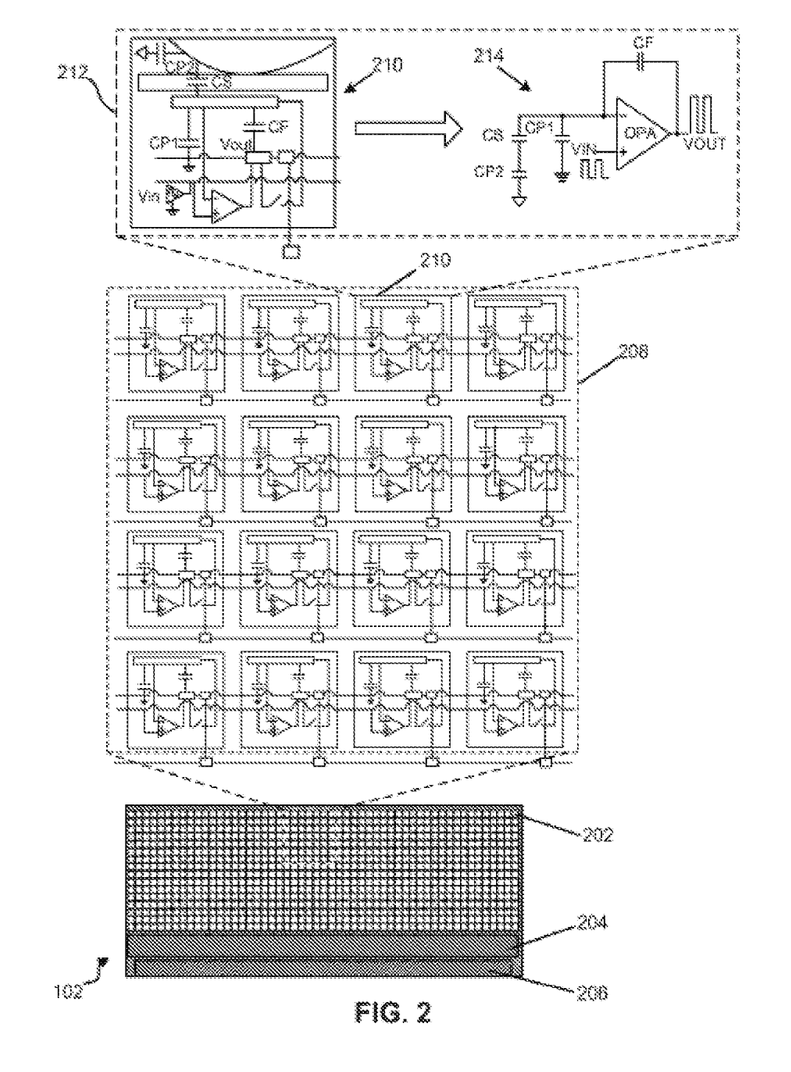
FIG. 2 is a diagram showing an exemplary sensor chip

FIG. 2 is a diagram showing an exemplary sensor chip 102. The sensor chip 102 can include a pixelated sensing element array 202 which can occupy a significant portion of the sensor chip 102. Each sensor pixel in the pixelated sensing element array 202 can include a CMOS capacitive sensor or other types of sensors that can sense fingerprint features. The sensor chip 102 can include a signal processing unit 204 for processing signals received from all of the sensor pixels in the pixelated sensing element array 202, and a connection unit 206 electrically coupled to the signal processing unit 204. The signal processing unit can include various signal processing components including amplifiers, filters, and an analog to digital converter (ADC) as substantially shown and described with respect to FIG. 4. The connection unit 206 can include multiple electrodes which can be connected to external circuitry through wire-bonding, bump bonding or other connection means. The connection unit 206 can be disposed along an edge of the sensor chip 102 for the convenience of interfacing with other components of the fingerprint sensor device 100.

The array 202 of sensor pixels in the sensor chip 102 can be arranged to have various shapes and sizes. For example, the array 202 of sensor pixels can be arranged to have a rectangular shape with a width of the rectangular shape being larger than a height of the rectangular shape. Exemplary sizes for the rectangular shaped sensor chip can include 24×88, 32×88, 56×88 sensor pixels. In some implementations, the array 202 of sensor pixels in the sensor chip 102 can be arranged to have a square shape. Exemplary sizes for the square shaped sensor chip 102 include 32×32, 64×64, 96×96 and 128×128 sensor pixels.

In FIG. 2, a subset 208 of the array 202 of sensor pixels is magnified to show the structure of each individual sensor pixel (e.g., sensor pixel 108). The subset 208 is a four-by-four square matrix of 16 sensor pixels. The sensor pixels in the array 202 can be electrically connected by rows or columns or both to allow CMOS image sensor-like sensing operations. One 210 of the sensor pixels in the four-by-four subset is further magnified to show structural details 212 including the circuit equivalent 214 of the sensor pixel 210. The structural and circuit equivalent components of the sensor pixel 210 are substantially similar to those shown and described with respect to the sensor pixel 108 in FIGS. 1B and 1C. Each row or column of sensor pixels is electrically connected to the signal processing unit 204 to selectively control the sensor pixels including reading the sensor signals representing the sensing data. A multiplexing switch network or similar circuit component can be implemented to provide the electrical connection between the rows or columns of sensor pixels and the signal processing unit 204. In operation, one row or column of sensor pixels can be selectively read or scanned at a time by the signal processing unit 204 for performing sensing data readout through the multiplexing switch network. Thus, the signal processing unit 204 can selectively connect to and read from the rows or columns of sensor pixels one row or column at a time. To save power, only the pixels elements in the row or column connected to processing unit 204 can be selectively turned on at a time.

Figure 3A:
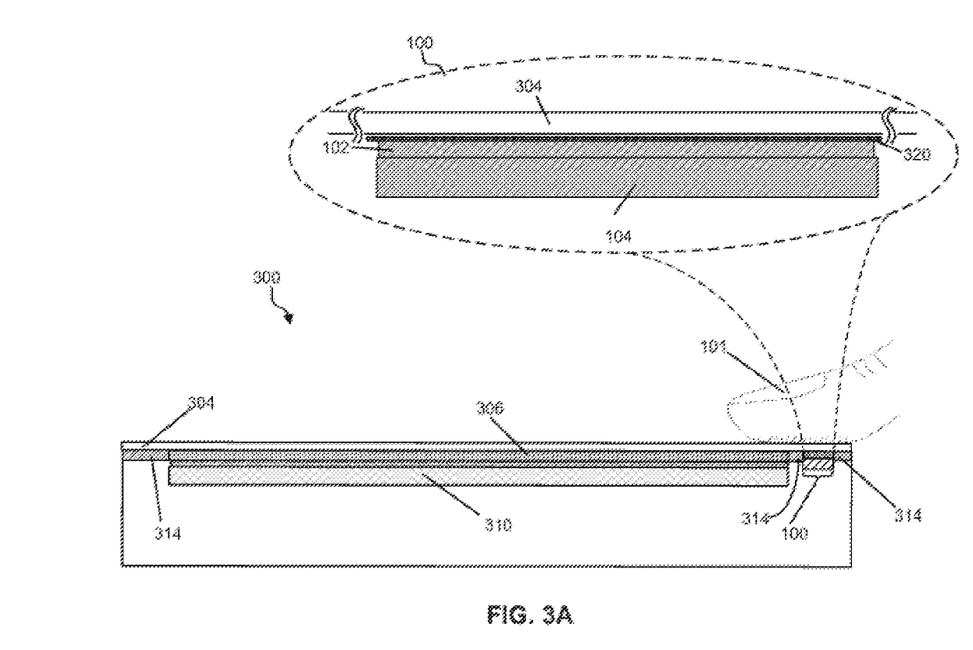
FIG. 3A is a schematic diagram showing a cross sectional view of an exemplary device (e.g., a mobile device) integrated with a touch screen assembly and a fingerprint sensor device.

FIG. 3A is a schematic diagram showing a cross sectional view of an exemplary device (e.g., a mobile device) 300 integrated with a touch screen assembly and a fingerprint sensor device 100. The mobile device 300 can include a fingerprint sensor device 100 disposed under a top cover glass 304 of the mobile device 300. The top cover glass 304 does not have an opening to expose a top surface (e.g., the surface exposed to the user) of the fingerprint sensor device 100. Because the fingerprint sensor device 100 is positioned underneath the top cover glass 304, the fingerprint sensor device 100 is can sense a fingerprint of a finger without being directly in contact with the finger 101.

The top glass 304 can be implemented using transparent materials other than glass including various crystalline structures, such as sapphire that provides the mobile device 300 with protection while allowing at least visible light to pass through. Also, the mobile device 300 includes a touch sensor 306 and an LCD display module 310 positioned underneath the touch panel 306. Touch sensor 306 can be implemented using various touch technologies including a capacitive touch sensor, an inductive touch sensor, and other touch sensors. The touch sensor 306 and the LCD display module 310 together form a touch screen assembly. When mobile device 300 is locked, LCD display module 310 can be turned off and a main processor of mobile device 300 and fingerprint sensor device 100 can be put in standby mode. To unlock mobile device 300, a user can make contact with the fingerprint detection module 100 with the user's finger, for example.

The top cover glass 304 can protect the touch sensor 306 and LCD display module 310 of the touch screen assembly and other areas of a top surface of the mobile device 300 substantially parallel with the top cover glass 304 beyond the touch sensitive area associated with the touch panel 306, including a location above the fingerprint sensor device 100. Touch sensor 306 can be embedded within a support glass 314 underneath the top cover glass 304. Top cover glass 304 and support glass 314 can be implemented using similar materials including the material used for the top cover glass 304. Support glass 314 can include an opening to allow fingerprint sensor device 100 to pass through the support glass 314 and placed under the top cover glass 304. The location of the opening in support glass 314 can be closer to one end of both the mobile device 300 and the support glass 314. The fingerprint sensor device 100 in this design can sense a contact from a fingerprint of a finger 101 with a top surface (e.g., the surface exposed to the user) of the hardened top cover glass 304 without having an object such as the finger 101 being in direct contact with a surface on the fingerprint sensor device 100. The top cover glass 304 can fully cover both the touch screen assembly and the fingerprint sensor device 100 under a spatially contiguous protective surface without an opening.

In some embodiments, top cover glass 304 and support glass 314 are bonded together to form an overall cover glass structure that is significantly thicker and mechanically stronger than each of top cover glass 304 and support glass 314 individually. The two glass layers may be bonded with a thin adhesive layer, such as an epoxy adhesive layer. Fingerprint sensor device 100 positioned within the opening of support glass 314 can be directly attached underneath top cover glass 304.

In FIG. 3A, the fingerprint sensor device 100 is magnified to show different components including the sensor chip 102 disposed over the substrate carrier 104 and a protective film or cover layer 306 disposed over the sensor chip 102. Optionally, a colored layer 320 can be disposed between the sensor chip 102 and the cover layer 304 to provide cosmetic coloring to the cover 304. Also, a transparent window can be used on the cover 304 to allow light to go through. The protective cover 304 can be made of transparent materials, such as sapphire or zirconia. The protective cover 304 can cover the entire surface of sensor chip 102.

Figure 3B:
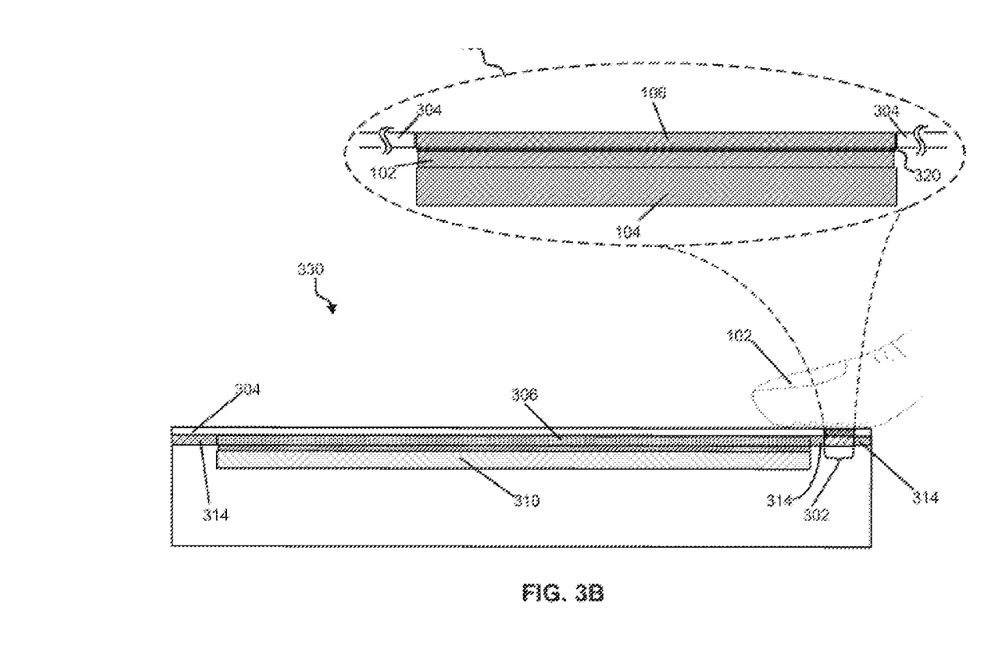
FIG. 3B is a schematic diagram showing a cross sectional view of another exemplary device (e.g., a mobile device) integrated with a touch screen assembly and a fingerprint sensor device.

FIG. 3B is a schematic diagram showing a cross sectional view of another exemplary device (e.g., a mobile device) 330 integrated with a touch screen assembly and a fingerprint sensor device 100. The mobile device 330 is substantially similar to the mobile device 300 except for embedding the fingerprint sensor device 100 within the top cover glass 304 so as to expose a top surface, the protective film or cover layer 106 of the fingerprint sensor device 100 to the environment including a user's finger 101. Even when exposed through the top cover glass 304, the protective film or cover layer 106 can still protect the fingerprint sensor device 100 and also function as a part of the dielectric layer between the surface of the finger 101 and the sensor electrode of each sensor pixel in the sensor chip 102.

Figure 4:
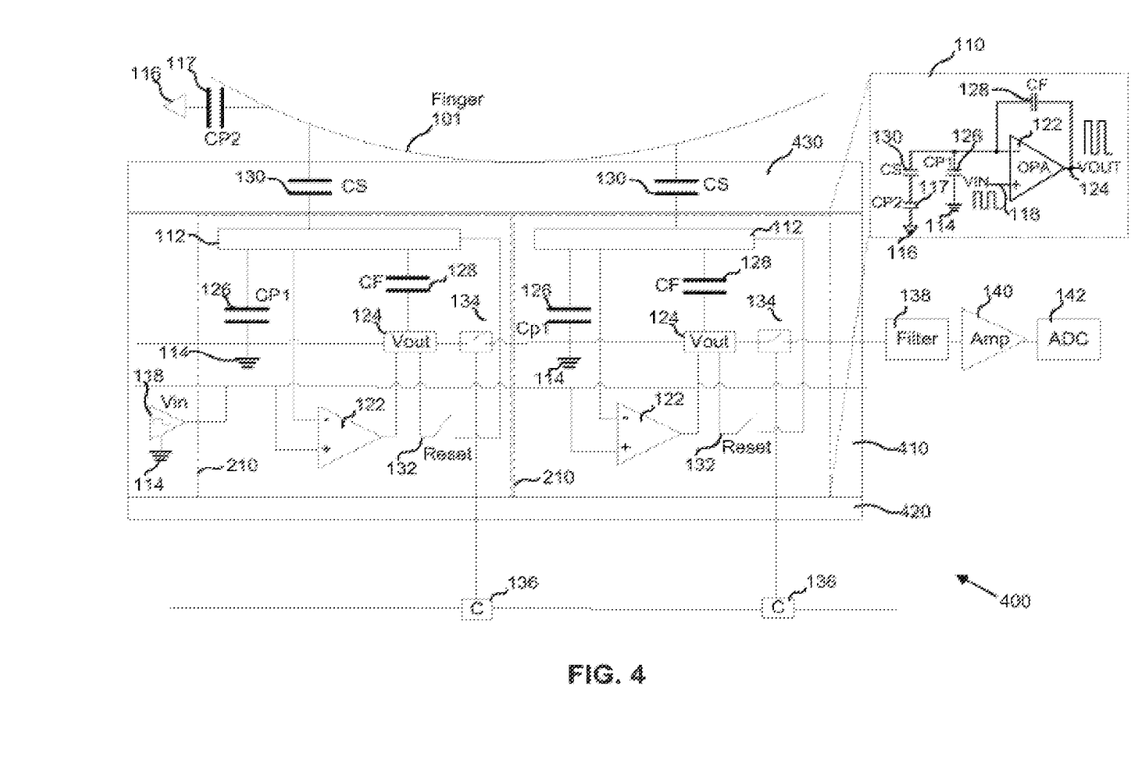
FIG. 4 is a schematic diagram showing a cross sectional view of an exemplary fingerprint sensor device.

FIG. 4 is a schematic diagram showing a cross sectional view of an exemplary fingerprint sensor device 400. The exemplary fingerprint sensor device 400 can be implemented to be substantially similar to the fingerprint sensor device 100. The fingerprint sensor device 400 does include additional structural details omitted from the fingerprint sensor device 100. For example, the fingerprint sensor 400 includes a sensor chip 410 disposed over a substrate carrier 420. A protective cover layer 430 is disposed over the sensor chip 410. The protective cover layer can include a material similar to the cover glass 304 such as glass, sapphire, a protective coating material, a protective film material, and other hardened and transparent materials. For simplicity of illustration, the protective cover layer 430 is shown as a single layer in FIG. 4, but the protective cover layer 430 can be equivalent to the cover glass 304, the protective film or cover layer 106 or a combination of both layers. The protective materials can include multiple layers of materials, as plastic layer, coloring layer, and top hard coating layer.

The sensor chip 410 can be substantially similar to the sensor chip 102. In the example shown in FIG. 4, the sensor chip 410 is illustrated to include two sensor pixels 210 for simplicity of illustration. However, as described above, the sensor chip 410 includes a much greater number of sensor pixels. Also, FIG. 4 includes additional features of the sensor chip 410 including the interconnections between sensor pixels 210. For example, a common excitation or driving signal source Vin 118 is shown to be electrically connected to each positive or non-inverting input of the amplifier 122. In addition, the output signals Vout 124 of the amplifiers 122 in the sensor pixels 210 are electrically connected together using a switch 134 electrically coupled to each Vout 124 to selectively output the output signals Vout 124 from the sensor pixels 210 to a filter 138.

The switch 134 can be implemented using a transistor or other switching mechanisms and electrically coupled to a controller 136 to control the switching of the switch 134. The filter 138 can be electrically coupled to an amplifier 140, and the amplifier 140 can be electrically coupled to an analog to digital converter 142 to obtain fingerprint data from the individually sensed voltages sensed by the sensor pixels 210 in the sensor chip 400.

Each sensor pixel 210 can include a reset switch 132 to reset or discharge the capacitance in the capacitors between sensing events. The capacitance from the previous sensing event should be reset of discharged before a subsequent sensing event or ready to ensure accurate sensing an capture of the fingerprint data.

The circuitry of the sensor chip 410 including the sensor electrode 112 and other conductive layer elements can be implemented using various combinations of active semiconductor layers and insulating layers (e.g., $SiO_2$). In addition, the active and insulating layers can be disposed and arranged to minimize the electric fields between a conductive element distributing the excitation or drive signal Vin 114 to the sensor pixels and the sensor electrode 112. In fact, even when present, the electric fields between the conductive element of the excitation or drive signal Vin 114 and the sensor electrode 112 are not used or otherwise provided as an input to the amplifier 122. Thus, the sensed signal for each sensor pixel 210 in the sensor chip 400 is independent of the electric fields between the conductive element of the excitation or drive signal Vin 114 and the sensor electrode 112.

Similar to FIG. 2, FIG. 4 shows a circuit equivalent 110 of each sensor pixel 210. The various components including the capacitors in the circuit equivalent 110 were previously described with respect to FIG. 2.

Figure 5A:
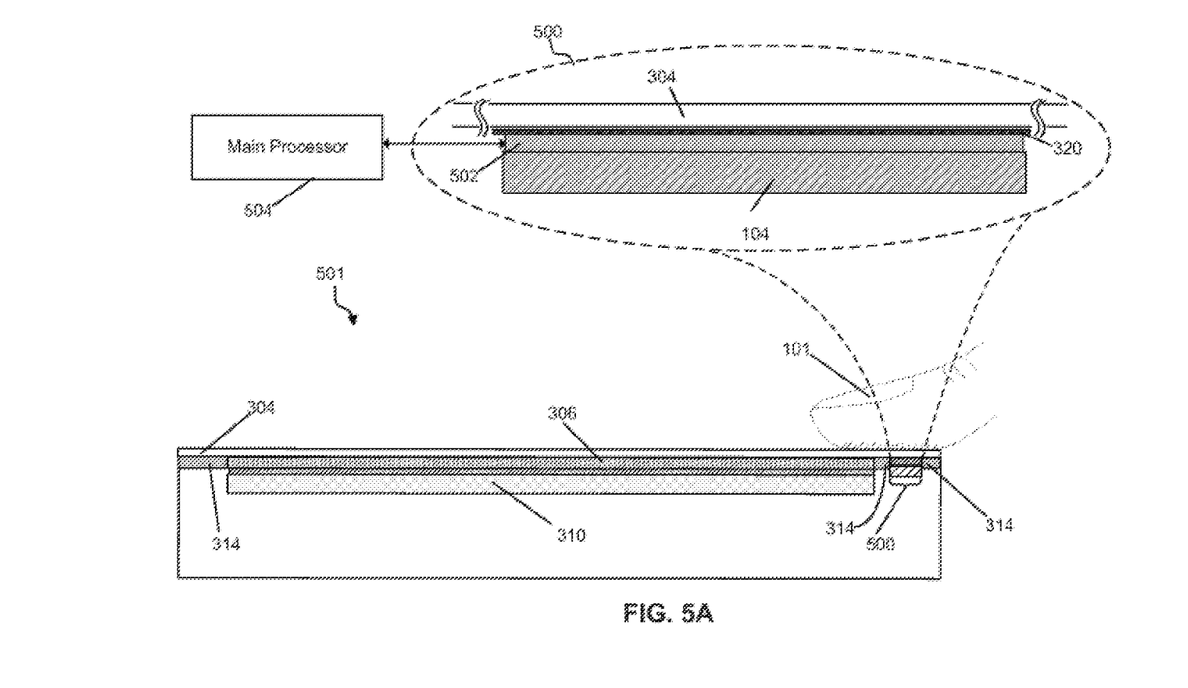
FIG. 5A is a schematic diagram showing a cross sectional view of an exemplary device (e.g., a mobile device) integrated with a touch screen assembly and a fingerprint sensor device with a wake-up function.

FIG. 5A is a schematic diagram showing a cross sectional view of an exemplary device (e.g., a mobile device) integrated with a touch screen assembly and a fingerprint sensor device with a wake-up function. FIG. 5A is similar to FIG. 3A and includes similar structural components identified by the same reference numbers. As shown in FIG. 5A, a mobile device 501 can include a fingerprint sensor device 500 disposed under a top cover glass 304 of the mobile device 501. The top cover glass 304 does not have an opening to expose a top surface (e.g., the surface exposed to the user) of the fingerprint sensor device 500. Because the fingerprint sensor device 500 is positioned underneath the top cover glass 304, the fingerprint sensor device 500 can sense a fingerprint of a finger without being directly in contact with the finger 101. Also, a physical control button is not needed in the implementation shown in FIG. 5A. The fingerprint sensor device 500 can also include a lateral vibrator to provide haptic feedback to the finger in different oscillating vibrations.

The top glass 304 can be implemented using transparent materials other than glass including various crystalline structures, such as sapphire that provides the mobile device 300 with protection while allowing at least visible light to pass through. Also, the mobile device 300 includes a touch sensor 306 and an LCD display module 310 positioned underneath the touch panel 306. Touch sensor 306 can be implemented using various touch technologies including a capacitive touch sensor, an inductive touch sensor, and other touch sensors. The touch sensor 306 and the LCD display module 310 together form a touch screen assembly. When mobile device 300 is locked, LCD display module 310 can be turned off and a main processor 504 of mobile device 300 and fingerprint sensor device 500 can be put in standby mode. To unlock or wake up the mobile device 501, a user can make contact with the fingerprint detection module 500 with the user's finger positioned on the top cover glass 304, for example. When the fingerprint detection module 500 senses the finger positioned on the top cover glass 304, via capacitive sensing for example, a signal is sent to a main processor 504 of the mobile device 501 as a feedback mechanism to initiate wakeup or unlock sequence to wake or unlock the mobile device 501 and initiate fingerprint sensing using the fingerprint detection module 500. To filter out an unintended touch, the fingerprint detection module 500 may require the sensed touch to be maintained for a predetermined time duration as a threshold for sending the wakeup or unlock signal to the main processor 504.

The top cover glass 304 can protect the touch sensor 306 and LCD display module 310 of the touch screen assembly and other areas of a top surface of the mobile device 300 substantially parallel with the top cover glass 304 beyond the touch sensitive area associated with the touch panel 306, including a location above the fingerprint sensor device 500. Touch sensor 306 can be embedded within a support glass 314 underneath the top cover glass 304. Top cover glass 304 and support glass 314 can be implemented using similar materials including the material used for the top cover glass 304. Support glass 314 can include an opening to allow fingerprint sensor device 500 to pass through the support glass 314 and placed under the top cover glass 304. The location of the opening in support glass 314 can be closer to one end of both the mobile device 501 and the support glass 314. The fingerprint sensor device 500 in this design can sense a contact from a fingerprint of a finger 101 with a top surface (e.g., the surface exposed to the user) of the hardened top cover glass 304 without having an object such as the finger 101 being in direct contact with a surface on the fingerprint sensor device 500. The top cover glass 304 can fully cover both the touch screen assembly and the fingerprint sensor device 500 under a spatially contiguous protective surface without an opening.

In some embodiments, top cover glass 304 and support glass 314 are bonded together to form an overall cover glass structure that is significantly thicker and mechanically stronger than each of top cover glass 304 and support glass 314 individually. The two glass layers may be bonded with a thin adhesive layer, such as an epoxy adhesive layer. Fingerprint sensor device 500 positioned within the opening of support glass 314 can be directly attached underneath top cover glass 304.

In FIG. 5A, the fingerprint sensor device 500 is magnified to show different components including a sensor chip 502 disposed over the substrate carrier 504 and a protective film or cover layer 306 disposed over the sensor chip 502. Optionally, a colored layer 320 can be disposed between the sensor chip 502 and the cover layer 304 to provide cosmetic coloring to the cover 304. Also, a transparent window can be used on the cover 304 to allow light to go through. The protective cover 304 can be made of transparent materials, such as sapphire or zirconia. The protective cover 304 can cover the entire surface of sensor chip 502.

Figure 5B:
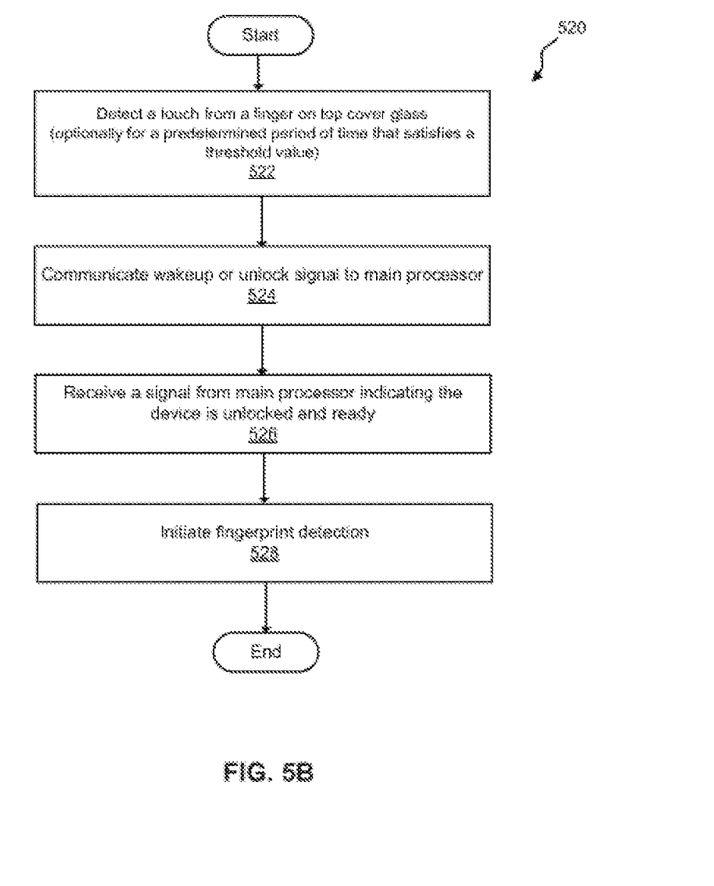
FIG. 5B is a block diagram showing a feedback mechanism for waking up the mobile device and the fingerprint sensor.

FIG. 5B is a process flow diagram showing an exemplary process 520 for unlocking the device of FIG. 5A using the fingerprint detection module. The processing 520 includes detecting, by the fingerprint sensor chip (e.g., fingerprint sensor chip 502 of the fingerprint module 500) a touch from a finger on the top cover (522). Responsive to the detected touch, the fingerprint sensor chip 502 communicates a wakeup or unlock signal to the main processor to indicate a request to unlock the device and initiate fingerprint detection to provide access to the user (524). Responsive to the communicated wakeup or unlock signal, the fingerprint sensor chip 502 receives a response signal from the main processor indicating the device is unlocked and ready (526). The fingerprint sensor chip 502 initiates fingerprint detection responsive to receiving the response signal from the main processor.

In some implementations, detecting the touch from a finger can include detecting the touch for a predetermined time period that satisfies a threshold time. This ensures that any inadvertent touches are filtered out and the device is not unlocked unintentionally. In some implementations, the lateral vibrator can provide a haptic feedback to the finger in different oscillating vibrations to indicate to the user that the finger touch has been successful in waking up or unlocking the device.

Figure 6A:
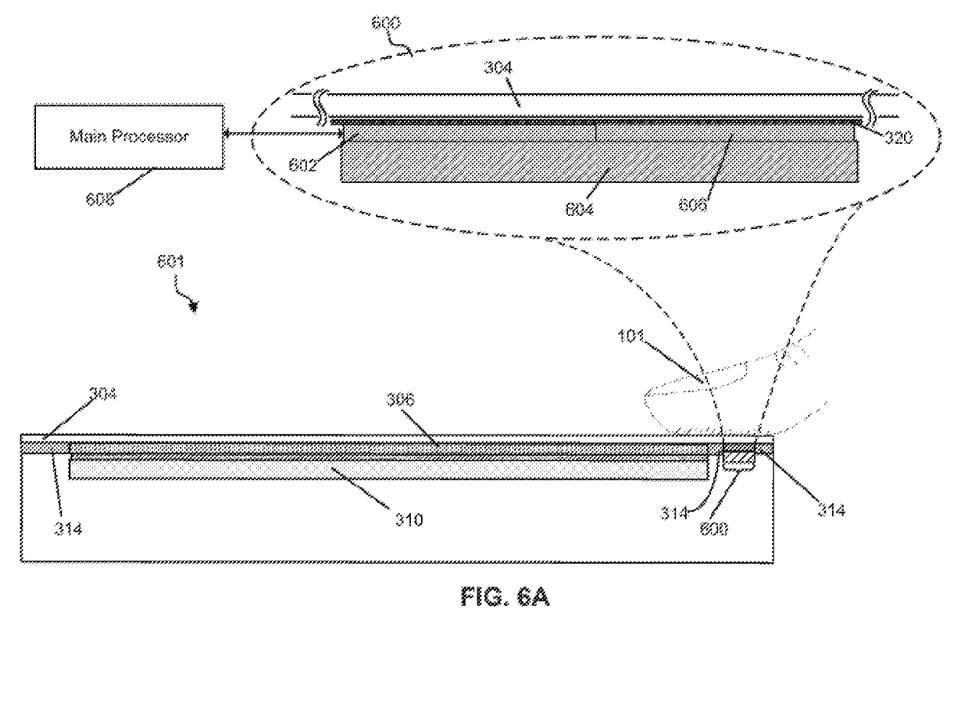
FIG. 6A is a schematic diagram showing a cross sectional view of an exemplary device (e.g., a mobile device) integrated with a touch screen assembly and a fingerprint sensor device with a pressure sensor.

FIG. 6A is a schematic diagram showing a cross sectional view of an exemplary device (e.g., a mobile device) integrated with a touch screen assembly and a fingerprint sensor device with a pressure sensor. FIG. 6A is similar to FIG. 5A and includes similar structural components identified by the same reference numbers. As shown in FIG. 6A, a mobile device 300 can include a fingerprint sensor device 600 disposed under a top cover glass 304 of the mobile device 601. The top cover glass 304 does not have an opening to expose a top surface (e.g., the surface exposed to the user) of the fingerprint sensor device 600. Because the fingerprint sensor device 600 is positioned underneath the top cover glass 304, the fingerprint sensor device 600 can sense a fingerprint of a finger without being directly in contact with the finger 101. Also, a physical control button is not needed in the implementation shown in FIG. 6A.

The fingerprint sensor device 600 includes a fingerprint sensor chip 602, which is similar to the fingerprint sensor chip 102, disposed over a substrate carrier. The fingerprint sensor device 600 can also include a pressure sensor 606 disposed over the substrate carrier 604 at the same plane as the fingerprint sensor chip 602. In some implementations, the fingerprint sensor chip 602 and the pressure sensor 606 are integrated into a single integrated circuit (IC). In some implementations, the fingerprint sensor chip 602 and the pressure sensor are disposed over the substrate carrier 604 as a system on a chip (SOC). In some implementations, the fingerprint sensor chip 602 and the pressure sensor 606 are disposed as separate ICs. The pressure sensor 606 can be implemented using a force sensor, a piezoelectric-based device, a microelectromechanical system (MEM) device, or other mechanical and electrical devices for sensing pressure or force. The pressure or force sensor can be coupled with a lateral vibrator to provide haptic feedback to the finger in different oscillating vibrations.

The top glass 304 can be implemented using transparent materials other than glass including various crystalline structures, such as sapphire that provides the mobile device 601 with protection while allowing at least visible light to pass through. Also, the mobile device 601 includes a touch sensor 306 and an LCD display module 310 positioned underneath the touch panel 306. Touch sensor 306 can be implemented using various touch technologies including a capacitive touch sensor, an inductive touch sensor, and other touch sensors. The touch sensor 306 and the LCD display module 310 together form a touch screen assembly. When mobile device 601 is locked, LCD display module 310 can be turned off and a main processor 608 of mobile device 601 and fingerprint sensor device 600 can be put in standby mode. To unlock or wake up the mobile device 601, a user can make contact with the fingerprint detection module 600 with the user's finger positioned on the top cover glass 304, for example. When the fingerprint detection module 600 senses the finger positioned on the top cover glass 304, via capacitive sensing for example, a signal is sent to a main processor 608 of the mobile device 601 as a feedback mechanism to initiate wakeup or unlock sequence to wake or unlock the mobile device 601 and initiate fingerprint sensing using the fingerprint detection module 600. To filter out an unintended touch, the fingerprint detection module 600 may require the sensed touch to be maintained with a predetermined amount of pressure to satisfy a threshold for sending the wakeup or unlock signal to the main processor 608. In some implementations, the predetermined amount of pressure may be required to be applied for a predetermined amount of time to satisfy both a pressure threshold and a time duration threshold.

The top cover glass 304 can protect the touch sensor 306 and LCD display module 310 of the touch screen assembly and other areas of a top surface of the mobile device 300 substantially parallel with the top cover glass 304 beyond the touch sensitive area associated with the touch panel 306, including a location above the fingerprint sensor device 600. Touch sensor 306 can be embedded within a support glass 314 underneath the top cover glass 304. Top cover glass 304 and support glass 314 can be implemented using similar materials including the material used for the top cover glass 304. Support glass 314 can include an opening to allow fingerprint sensor device 600 to pass through the support glass 314 and placed under the top cover glass 304. The location of the opening in support glass 314 can be closer to one end of both the mobile device 601 and the support glass 314. The fingerprint sensor device 600 in this design can sense a contact from a fingerprint of a finger 101 with a top surface (e.g., the surface exposed to the user) of the hardened top cover glass 304 without having an object such as the finger 101 being in direct contact with a surface on the fingerprint sensor device 600. The top cover glass 304 can fully cover both the touch screen assembly and the fingerprint sensor device 100 under a spatially contiguous protective surface without an opening.

In some embodiments, top cover glass 304 and support glass 314 are bonded together to form an overall cover glass structure that is significantly thicker and mechanically stronger than each of top cover glass 304 and support glass 314 individually. The two glass layers may be bonded with a thin adhesive layer, such as an epoxy adhesive layer. Fingerprint sensor device 600 positioned within the opening of support glass 314 can be directly attached underneath top cover glass 304.

In FIG. 6A, the fingerprint sensor device 600 is magnified to show different components including a sensor chip 602 disposed over the substrate carrier 604 and a protective film or cover layer 306 disposed over the sensor chip 602. Optionally, a colored layer 320 can be disposed between the sensor chip 602 and the cover layer 304 to provide cosmetic coloring to the cover 304. Also, a transparent window can be used on the cover 304 to allow light to go through. The protective cover 304 can be made of transparent materials, such as sapphire or zirconia. The protective cover 304 can cover the entire surface of sensor chip 602.

Figure 6B:
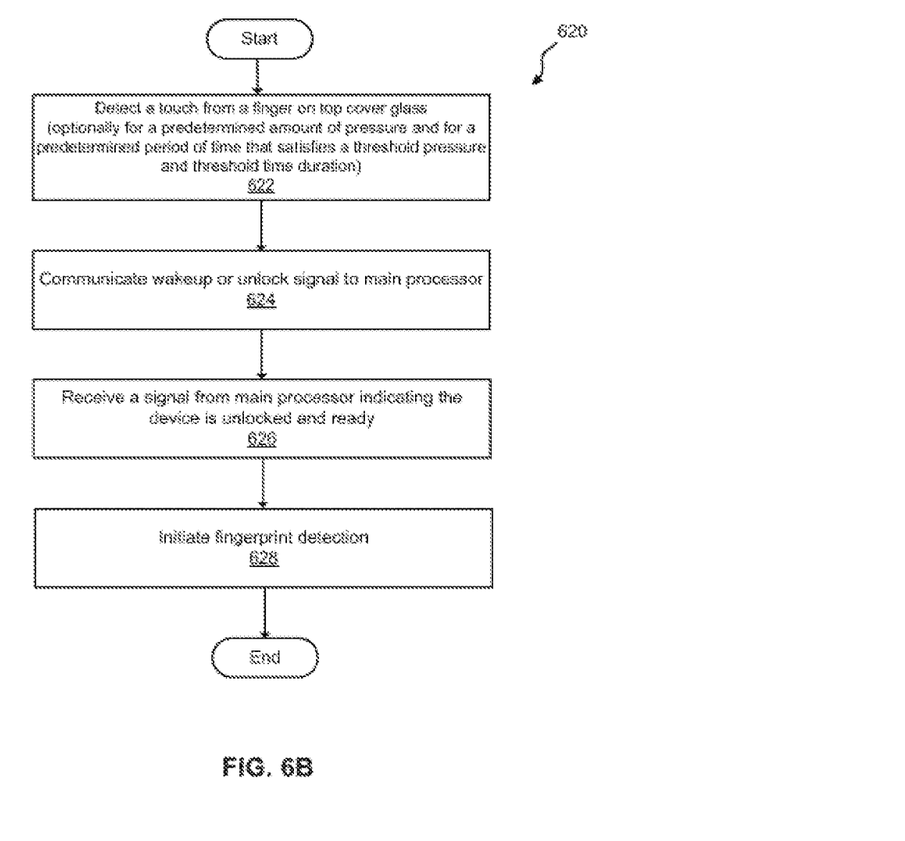
FIG. 6B is a block diagram showing a feedback mechanism for waking up the mobile device and the fingerprint sensor based on a signal from the pressure sensor.

FIG. 6B is a block diagram showing a feedback mechanism for waking up the mobile device and the fingerprint sensor based on a signal from the pressure sensor. The processing 620 includes detecting, by the fingerprint sensor chip (e.g., fingerprint sensor chip 602 of the fingerprint module 600) a touch from a finger on the top cover (622). Responsive to the detected touch, the fingerprint sensor chip 602 communicates a wakeup or unlock signal to the main processor 608 to indicate a request to unlock the device and initiate fingerprint detection to provide access to the user (624). Responsive to the communicated wakeup or unlock signal, the fingerprint sensor chip 602 receives a response signal from the main processor indicating the device is unlocked and ready (626). The fingerprint sensor chip 602 initiates fingerprint detection responsive to receiving the response signal from the main processor.

In some implementations, detecting the touch from a finger can include detecting the touch for a predetermined amount of pressure that satisfies a threshold pressure value. In some implementation, the pressure threshold must be satisfied in addition to a predetermined time period that satisfies a threshold time duration. This ensures that any inadvertent touches are filtered out and the device is not unlocked unintentionally. In some implementations, the lateral vibrator can provide a haptic feedback to the finger in different oscillating vibrations to indicate to the user that the finger touch has been successful in waking up or unlocking the device.

Various implementations, examples and embodiments of the fingerprint sensor device (e.g., fingerprint sensors 100, 400, 500 and 600) using the disclosed self-capacitive sensing technology have been described. The self-capacitive sensing fingerprint sensor device described in this disclosure implementing an array of active sensor pixels with pixel amplification can gain various advantages. For example, the self-capacitive sensing fingerprint sensor device implementing an array of active sensor pixels with pixel amplification can enhance signal to noise ratio compared to passive sensor pixels without direct sensor pixel excitation and sensor signal amplification. During scanning or reading of the sensor pixels, all sensor pixels in the row or column of sensor pixels being scanned or read can be selectively excited or driven using the excitation or drive signal Vin 118. Because all of the sensor pixels being scanned or read are driven, all of the read or scanned sensor pixels contribute to the sensor signal and thus enhances the signal to noise ratio.

In another example, the self-capacitive sensing fingerprint sensor device described in this disclosure does not use an excitation electrode external to the fingerprint sensor device for directly stimulating the finger. The absence of the external excitation electrode allows for a configuration where the entire fingerprint sensor device can be disposed under the protective cover glass of a mobile device. The under-the-glass configuration can protect the fingerprint sensor device from external conditions and objects including the finger, dust, moisture and other harmful objects. In addition, the under-the-glass configuration allows for a virtual button design rather than a mechanical button design. A virtual button has less moving parts that could potentially break and provides for a greater number of user input options than a simple push-button. For example, a virtual button can be effectuated using different touch gestures including light touch, swipe, touch-and-hold, multiple tap, etc. to indicate different input options.

While this disclosure contains many specifics, these should not be construed as limitations on the scope of any invention or of what may be claimed, but rather as descriptions of features that may be specific to particular embodiments of particular inventions. Certain features that are described in this disclosure in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this disclosure should not be understood as requiring such separation in all embodiments.

Only a few implementations and examples are described and other implementations, enhancements and variations can be made based on what is described and illustrated in this disclosure.

What is claimed is:
1. A fingerprint sensor device, comprising:
 a substrate;
 a fingerprint sensor disposed over the substrate, wherein the fingerprint sensor includes an array of sensor pixels configured to generate fingerprint data by sensing ridges and valleys of a surface of a finger contacting the fingerprint sensor device; and
 a pressure sensor disposed over the substrate at a plane of the fingerprint sensor, wherein the pressure sensor is configured to detect a pressure from the finger to communicate an unlock signal to initiate fingerprint detection;

wherein the fingerprint sensor is configured to send the unlock signal, responsive to the detected touch from the finger, to a main processor to indicate a request to initiate fingerprint detection; receive a response signal, responsive to the send unlock signal, from the main processor acknowledging that a mobile device is waking up; and initiate a fingerprint detection responsive to the received response signal.

2. The fingerprint sensor device of claim 1, further comprising a lateral vibrator to provide a haptic feedback to the finger.

3. The fingerprint sensor device of claim 1, wherein the fingerprint sensor and the pressure sensor are integrated into a single integrated circuit chip.

4. The fingerprint sensor device of claim 1, wherein the fingerprint sensor and the pressure sensor are integrated into a system on a chip.

5. The fingerprint sensor device of claim 1, wherein each sensor pixel includes:
   a single sensor electrode; and
   an amplifier having an inverting terminal electrically connected to the sensor electrode and a non-inverting terminal electrically connected to a drive signal;
   wherein the drive signal generates electric fields between the sensor electrode and at least one of the ridges and valleys of the surface of the finger contacting the fingerprint sensor device to generate a variable capacitor having a variable capacitance based at least partly on a distance between the sensor electrode and the at least one of the ridges and valleys of the finger;
   wherein the amplifier is electrically connected to a feedback capacitor in a negative feedback loop between an output terminal and the inverting terminal of the amplifier.

6. The fingerprint sensor device of claim 1, wherein:
   the fingerprint sensor includes the array of sensor pixels electrically arranged in rows or columns.

7. The fingerprint sensor device of claim 6, wherein:
   the fingerprint sensor includes a signal processing unit electrically connected to the array of sensor pixels electrically arranged in rows or columns to process fingerprint data received from the array of sensor pixels.

8. The fingerprint sensor device of claim 7, wherein:
   the fingerprint sensor includes a multiplexing switch network configured to electrically connect the signal processing unit to the array of sensor pixels electrically arranged in rows or columns;
   wherein the multiplexing switch network is configured to selectively electrically connect the signal processing unit to the array of sensor pixels one row or column at a time, to selectively power one or more sensor pixels in the corresponding row or column electrically connected to the signal processing unit.

9. An electronic device, comprising
a main processor; and
a fingerprint sensor device, including:
   a substrate;
   a fingerprint sensor disposed over the substrate, wherein the fingerprint sensor includes an array of sensor pixels configured to generate fingerprint data by sensing ridges and valleys of a surface of a finger contacting the fingerprint sensor device; and
   a pressure sensor disposed over the substrate at a plane of the fingerprint sensor, wherein the pressure sensor is configured to detect a pressure from the finger to communicate an unlock signal to the main processor to unlock the electronic device and initiate fingerprint detection;
   wherein the fingerprint sensor is configured to send the unlock signal, responsive to the detected touch from the finger, to the main processor to indicate a request to initiate fingerprint detection; receive a response signal, responsive to the send unlock signal, from the main processor acknowledging that a mobile device is waking up; and initiate a fingerprint detection responsive to the received response signal.

10. The electronic device of claim 9, further comprising a lateral vibrator to provide a haptic feedback to the finger.

11. The electronic device of claim 9, wherein the fingerprint sensor and the pressure sensors are integrated into a single integrated circuit chip.

12. The electronic device of claim 9, wherein the fingerprint sensor and the pressure sensors are integrated into a system on a chip.

13. The electronic device of claim 9, wherein each sensor pixel includes:
   a single sensor electrode; and
   an amplifier having an inverting terminal electrically connected to the sensor electrode and a non-inverting terminal electrically connected to a drive signal; wherein the drive signal generates electric fields between the sensor electrode and at least one of the ridges and valleys of the surface of the finger contacting the fingerprint sensor device to generate a variable capacitor having a variable capacitance based at least partly on a distance between the sensor electrode and the at least one of the ridges and valleys of the finger; and
   a protective cover disposed over the fingerprint sensor device.

14. The electronic device of claim 13, wherein the amplifier is configured to generate the output signal based at least on the variable capacitance and feedback capacitance of the feedback capacitor with no additional non-parasitic capacitances.

15. The electronic device of claim 13, wherein the fingerprint sensor device disposed under the protective cover is configured to function as a virtual button with no mechanical actuators.

16. The electronic device of claim 9, wherein:
   the protective cover includes an opening, and the fingerprint sensor device is disposed through the opening; and
   the fingerprint sensor device includes an integrated protective cover separate from the protective cover of the electronic device to protect the sensor chip against direct contact with the surface of the finger.

17. A method of unlocking a mobile device, the method comprising:
   detecting, by a fingerprint sensor device in the mobile device, a touch from a finger;
   sending a wakeup signal, responsive to the detected touch from the finger, to a main processor of the mobile device to initiate wakeup of the mobile device;
   receiving a response signal, responsive to the send wakeup signal, from the main processor acknowledging that the mobile device is waking up; and
   initiating a fingerprint detection responsive to the received response signal.

18. The method of claim 17, wherein the detecting the touch comprises:
   determining whether the detected touch is sustained for a predetermined period of time.

19. The method of claim 17, wherein the detecting the touch comprises:
   detecting a pressure from the finger; and
   determining whether the detected pressure satisfies a predetermined amount.

20. The method of claim 17, further comprising:
   providing a haptic feedback to the finger to acknowledge that the touch has been detected.

\* \* \* \* \*